US012738961B2

(12) United States Patent
Bonnafoux et al.

(10) Patent No.: US 12,738,961 B2
(45) Date of Patent: Sep. 15, 2026

(54) RADIO FREQUENCY RECEIVER

(71) Applicants: STMicroelectronics France, Montrouge (FR); STMicroelectronics (Crolles 2) SAS, Crolles (FR)

(72) Inventors: Clement Bonnafoux, Ayze (FR); Paul Svensson, Grenoble (FR); Pascal Urard, Theys (FR); Kosai Raoof, Le Versoud (FR); Youssef Serrestou, Beaumont les Valence (FR)

(73) Assignees: STMicroelectronics (Crolles 2) SAS, Crolles (FR); STMicroelectronics France, Montrouge (FR)

( * ) Notice: Subject to any disclaimer, the term of this patent is extended or adjusted under 35 U.S.C. 154(b) by 233 days.

(21) Appl. No.: 18/520,741

(22) Filed: Nov. 28, 2023

(65) Prior Publication Data

US 2024/0178869 A1 May 30, 2024

(30) Foreign Application Priority Data

Nov. 29, 2022 (FR) ...................................... 2212499

(51) Int. Cl.
*H04B 1/12* (2006.01)

(52) U.S. Cl.
CPC ..................................... *H04B 1/12* (2013.01)

(58) Field of Classification Search
CPC ........ H04B 1/12; H04B 1/0003; H04B 1/123; H04B 1/16; H03F 3/19; H03F 2200/294; H03F 2200/451; H03H 17/0286; H03M 1/121
USPC ........................................ 375/316, 340, 350
See application file for complete search history.

(56) References Cited

U.S. PATENT DOCUMENTS

| | | | | | |
|---|---|---|---|---|---|
| 5,479,449 | A * | 12/1995 | Patel | H04N 21/4382 | 375/321 |
| 7,161,515 | B2 * | 1/2007 | Slavin | H03M 1/1033 | 341/120 |
| 9,407,276 | B1 * | 8/2016 | Coban | H03M 1/1009 | |
| 9,667,291 | B2 * | 5/2017 | Pratt | H04L 23/00 | |
| 2002/0141521 | A1 * | 10/2002 | Rocha | H03D 3/008 | 375/350 |
| 2012/0086504 | A1 * | 4/2012 | Tsukamoto | H04B 1/0028 | 327/551 |
| 2016/0191020 | A1 * | 6/2016 | Velazquez | H04L 25/02 | 341/118 |
| 2016/0277046 | A1 * | 9/2016 | Pratt | H04B 1/525 | |

(Continued)

FOREIGN PATENT DOCUMENTS

WO 02093807 A1 11/2002

OTHER PUBLICATIONS

INPI Search Report and Written Opinion for priority application, FR Appl. No. 2212499, report dated Jun. 17, 2023, 9 pgs.

*Primary Examiner* — Emmanuel Bayard
(74) *Attorney, Agent, or Firm* — CROWE & DUNLEVY LLC

(57) ABSTRACT

A reception element receives an analog signal. The received analog signal is converted by a reception chain into a digital signal. Based on the digital signal and a first filtering operation, a correction chain generates a correction digital signal reconstituting dynamic nonlinearities generated by the reception chain. A corrected signal from which the reconstituted dynamic nonlinearities have been removed is then generated by subtracting the correction digital signal from the digital signal.

30 Claims, 10 Drawing Sheets

(56) References Cited

U.S. PATENT DOCUMENTS

| | | | | |
|---|---|---|---|---|
| 2016/0380643 | A1* | 12/2016 | Coban | H03M 1/124<br>341/118 |
| 2017/0324421 | A1* | 11/2017 | Tangudu | H03M 1/0617 |
| 2019/0028131 | A1* | 1/2019 | Wang | H04B 1/10 |
| 2022/0385318 | A1* | 12/2022 | Wang | H04B 1/10 |
| 2023/0082687 | A1* | 3/2023 | Peschke | H03M 1/1245<br>341/143 |
| 2023/0275594 | A1* | 8/2023 | Gupta | H03M 1/1042<br>341/118 |

* cited by examiner

RADIO FREQUENCY RECEIVER

PRIORITY CLAIM

This application claims the priority benefit of French Application for Patent No. 2212499, filed on Nov. 29, 2022, the content of which is hereby incorporated by reference in its entirety to the maximum extent allowable by law.

TECHNICAL FIELD

The present disclosure generally relates to methods and circuits for the reception of radio frequency signals.

BACKGROUND

High-rate communication networks, such as, for example, 5G telecommunications networks having a data rate for example in the range from 1 to 10 Gbits per second, require high-frequency carriers.

However, the electronic components of circuits, such as, for example, low-noise amplifiers as well as analog-to-digital converters, are not always well suited to process high frequencies. Indeed, used at high frequencies, these components have defects particularly causing the occurrence of nonlinearities in a signal. There exist nonlinearities which are dependent on the frequency of the signal. These nonlinearities are called dynamic and are particularly disturbing for analog-to-digital converters, in particular, beyond 5 GHz.

The occurrence of nonlinearities during the conversion of a signal, and after a high-frequency sampling, is aggravated by the aging of the components and/or by a use submitted to extreme temperature variations, for example in the case of satellites, and/or by manufacturing variations of the components and circuits.

There thus exists a need for a solution to correct these nonlinearities originating from the reception chain. In particular, there exists a need for a solution to correct these nonlinearities by a digital processing of the signal, with no prior knowledge of the converted signal.

SUMMARY

An embodiment provides a circuit comprising: a reception element configured to receive an analog signal; a reception chain configured to convert the received analog signal into a digital signal; and a correction chain configured to generate a digital signal reconstituting dynamic nonlinearities generated by the reception chain, based on the digital signal and on a first filter, the circuit being further configured to generate a corrected signal by removing the reconstituted dynamic nonlinearities from the digital signal.

According to an embodiment, the reception chain comprises a coupling circuit, a low-noise amplifier, and a time interleaved analog-to-digital converter.

According to an embodiment, the circuit further comprises a non-volatile memory storing instructions allowing the programming of the correction chain, the circuit further comprising a processor configured to execute the instructions as a result of the reception, by the reception element, of the analog signal.

According to an embodiment, the correction chain is implemented by an application-specific integrated circuit.

An embodiment provides a method comprising: receiving, by a reception element of a circuit, an analog signal; converting, via a reception chain of the circuit, the analog signal into a digital signal; generating, by a correction chain, a signal estimating dynamic nonlinearities generated by the reception chain, based on the digital signal and based on a first digital filter; and generating a corrected digital signal by removing the reconstituted dynamic nonlinearities from the digital signal.

According to an embodiment, generating the dynamic nonlinearities by the correction chain comprises: upsampling the digital signal; applying a second filter to the upsampled signal; generating harmonics and intermodulation products of rank 3 by multiplication by a coefficient of the cubing of the upsampled and filtered digital signal; applying the first filter to the harmonics and intermodulation products of rank 3; and downsampling the filtered harmonics and intermodulation products of rank 3.

According to an embodiment, the second filter is an infinite impulse response filter synthesized to reverse the phase rotation induced by an analog filter of the reception chain.

According to an embodiment, the first filter is a digital infinite impulse response filter configured to model the analog filter of the reception chain.

According to an embodiment, the first filter is a filter having a transfer function corresponding to a transfer function of the reception chain to within 3 dB in amplitude and to within 2° in phase until the cut-off frequency.

According to an embodiment, the amplitude transfer function F of the first filter is of form:

$$F(z) = \frac{\sum_{k=0}^{Nb-1} b_k z^{-k}}{1 + \sum_{l=1}^{Na-1} a_l z^{-l}},$$

where Nb is the number of coefficients of the numerator of the first filter, Na is the number of coefficients of the denominator of the first filter and where coefficients $\{b_0, \ldots, b_{Nb-1}\}$ and $\{a_1, \ldots, a_{Na-1}\}$ are optimized as a result of the execution of an optimization algorithm.

According to an embodiment, the correction chain further comprises the application of a gain correction operation.

According to an embodiment, the correction chain is further configured to upsample the digital signal by a number N, N being an integer greater than or equal to 2, and for example equal to 8.

According to an embodiment, the above method further comprises: downsampling the reconstituted harmonics and intermodulation products of rank 3, wherein the downsampling is for example a decimation by number N.

According to an embodiment, upsampling, by the correction chain, the downsampled digital signal comprises applying a plurality of successive operations, each operation comprising: inserting a zero between each sample; and applying a finite impulse response low-pass filter, or applying a finite impulse response high-pass filter.

According to an embodiment, the above method further comprises applying a finite impulse response bandpass filter as well as applying a delay compensation operation to the digital signal, before generating the corrected digital signal.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the different sampling, upsampling, and downsampling methods are not described in details and are known by those skilled in the art.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figure 1:
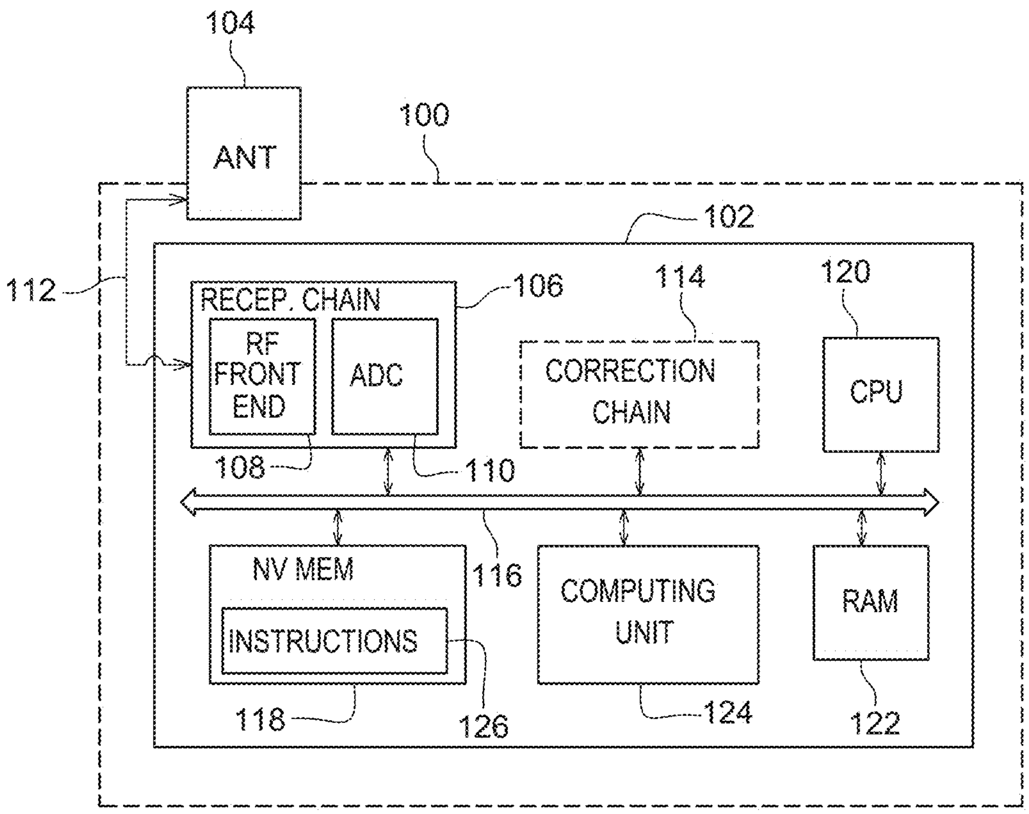
FIG. 1 very schematically shows et in the form of blocks, an electronic device according to an embodiment of the present disclosure.

FIG. 1 very schematically shows in the form of blocks an electronic device 100 comprising an integrated circuit 102 according to an embodiment of the present disclosure.

Electronic device 100 further comprises a reception element 104, for example, an antenna ANT, configured to receive, with a significant rate, analog signals. As an example, reception element 104 is configured to receive a Radio Frequency (RF) signal having a frequency within a range for example from 1 to 30 GHz, and transmitting data with a rate in the range from 10 giga samples per second to 15 giga samples per second.

Electronic device 100 is, for example, a wireless and/or mobile device, such as computer hardware, a smartphone, etc.

Circuit 102 further comprises a reception circuit 106 (RECEP. CHAIN) comprising a front-end circuit 108 (RF FRONT END) and an analog-to-digital converter 110 (ADC). Reception circuit 106 is configured to generate a digital signal based on an analog signal received by reception element 104.

As an example, reception element 104 is coupled to reception circuit 106 via one or a plurality of wires 112.

According to an embodiment, circuit 102 further comprises a correction chain 114 (CORRECTION CHAIN). Correction chain 114 is configured to correct the digital signal. As an example, the correction comprises the removal of dynamic nonlinear noise occurring during the conversion of the analog signal by reception circuit 106. The nonlinear noise is initially static noise, but as a result of its processing by front-end circuit 108, and in particular by a filter of front-end circuit 108, this noise becomes dynamic. Indeed, the filter of front-end circuit 108 modifies the phase and the amplitude of the nonlinearities according to their frequency. Correction chain 114 is, for example, coupled to reception circuit 106 via a bus 116.

Circuit 102 further comprises, for example, a non-volatile memory 118 (NV MEM), a generic processor 120 (CPU), a volatile memory 122 (RAM), for example a random access memory and/or a computing circuit 124 (COMPUTING UNIT). Computing circuit 124 comprises, for example, one or a plurality of hardware accelerators.

According to an embodiment, correction chain 114 is formed by an application specific integrated circuit (ASIC). According to another embodiment, non-volatile memory 118 comprises instruction codes 126 (INSTRUCTIONS) configured to, when they are executed by processor 120 and/or by computing circuit 124, program correction chain 114 and correct the digital signal.

As an example, the correction comprises the removal of the dynamic nonlinear noise occurring during the conversion of the analog signal by reception circuit 106.

Figure 2:
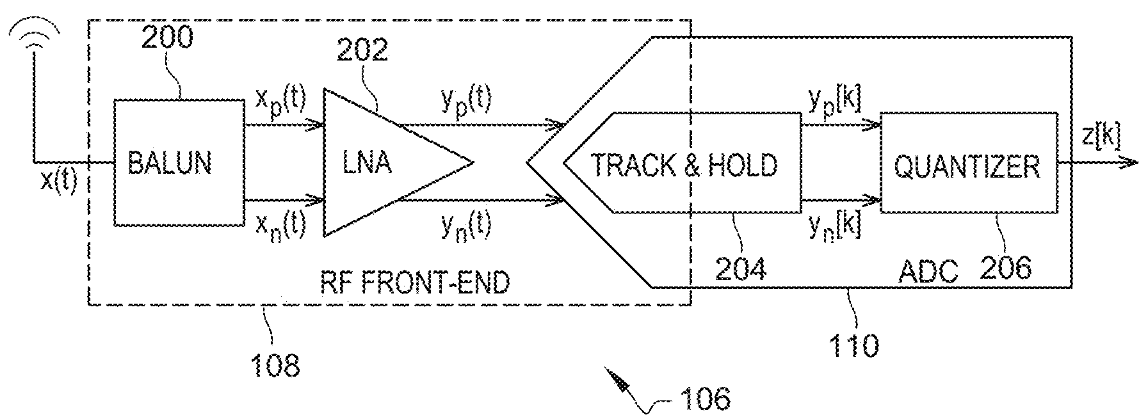
FIG. 2 very schematically shows in the form of blocks, an embodiment of a reception chain configured to convert an analog signal into a digital signal.

FIG. 2 very schematically shows in the form of blocks an embodiment of reception chain 106 configured to convert an analog signal x(t) received for example via receiver 104, into a digital signal z[k], where variable t is a time variable and variable k is a discrete variable.

Reception circuit 106 comprises front-end circuit 108 and analog-to-digital converter 110.

Front-end circuit 108 comprises, for example, a coupling circuit 200 (BALUN, "Balanced to Unbalanced") configured to transform the analog signal x(t) into differential signals $x_p(t)$, equal to signal x(t), and $x_n(t)$, equal to the opposite of signal x(t). Front-end circuit 108 further comprises a low-noise amplifier (LNA) circuit 202 configured to generate analog signals $y_p(t)$ and $y_n(t)$ by amplifying the analog signal $x_p(t)$ and $x_n(t)$ while minimizing the noise introduced by amplifier 202 itself.

Analog signals $y_p(t)$ and $y_n(t)$ are then supplied to analog-to-digital converter 110. As an example, converter 110 is a time interleaved analog-to-digital converter (TiADC) configured to sample analog signals $y_p(t)$ and $y_n(t)$ at very high frequency, for example at a sampling frequency $F_s$ in the range from 1 and 10 GHz. As an example, converter 110 comprises a plurality of analog-to-digital converters in parallel.

Converter 110 comprises, for example, a track-and-hold circuit 204 (TRACK & HOLD) configured to sample analog signals $y_p(t)$ and $y_n(t)$, for example by locking them for a given time period. In another example, circuit 204 is a sample-and-hold circuit.

Converter 110 further comprises a quantizer 206 (QUANTIZER) configured to quantize, or code, the locked analog signals, into digital signals $y_p[k]$ and $y_n[k]$, over a plurality of bits.

Figure 3:
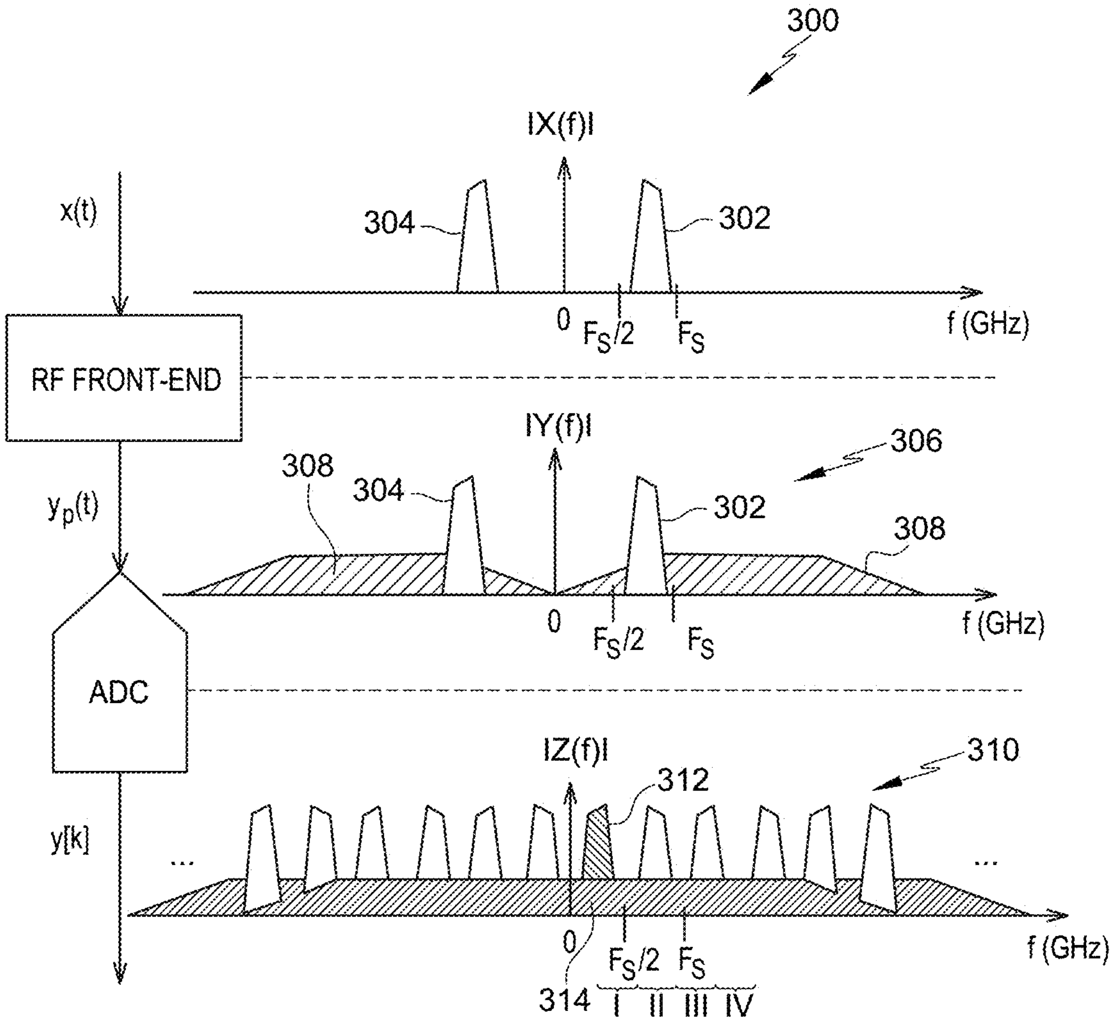
FIG. 3 illustrates the spectrum of a signal processed, in the second Nyquist band, by the reception chain of FIG. 2 during the conversion.

FIG. 3 illustrates the spectrum of a signal processed by the reception chain of FIG. 2 during the conversion.

When the input signal x(t) has frequency components in frequency ranges in the order of one GHz and when the sampling frequency is also in the order of one GHz, low-noise amplifier 202 and converter 110 generate dynamic nonlinearities during the processing of the signal which are non-negligible and adversely affect the quality of the converted signal. In particular, these nonlinearities add noise to the signal, which causes a decrease of the signal-to-noise ratio (SNR) and thus a loss of information.

A graph 300 illustrates signal x(t) in the frequency range. In particular, graph 300 illustrates the magnitude |X(f)| of the spectrum of signal x(t) according to frequency f, expressed in GHz. The spectrum is then formed of two portions 302 and 304 symmetrical with respect to axis f=0. In this example, the received signal is in the second Nyquist band, between $F_s/2$ and $F_s$, where $F_s$ is the sampling period.

A graph 306 illustrates the spectrum |Y(f)| of signal $y_p(t)$ at the output of front-end circuit 108. The spectrum then comprises nonlinearities 308, for example resulting from the processing of the high-frequency signal by amplifier 110. Nonlinearities 308 comprise, for example, harmonics and intermodulation products of rank 3. Nonlinearities 308 further comprise harmonics of rank 2 and/or of a rank greater than 3 and/or frequency components resulting from intermodulation products ("spurs").

A graph 310 illustrates the spectrum |Z(f)| of signal z[k] at the output of converter 110.

Spectrum |Y(f)| has, for example, been sampled at sampling frequency $F_s$. Frequency $F_s$ is, for example, selected to be greater than $2F_B$, where $F_B$ is the bandwidth of the signal, to avoid the spectrum aliasing phenomenon during the sampling of the signal. The spectrum of the signal, as well as the different nonlinearities, have been periodically replicated every $F_s$ GHz during the sampling process. The portion of the spectrum located within the first Nyquist band (I), that is, within frequency interval [0, $F_s/2$] GHz, comprises the information, represented by a portion of spectrum 312, which is desired to be extracted. This information is the same as that contained in the input signal and shown by the portion of spectrum 302 and/or 304. However, the first Nyquist band further comprises nonlinearities 314, including, for example, harmonics and intermodulation products of rank 3.

Figure 4:
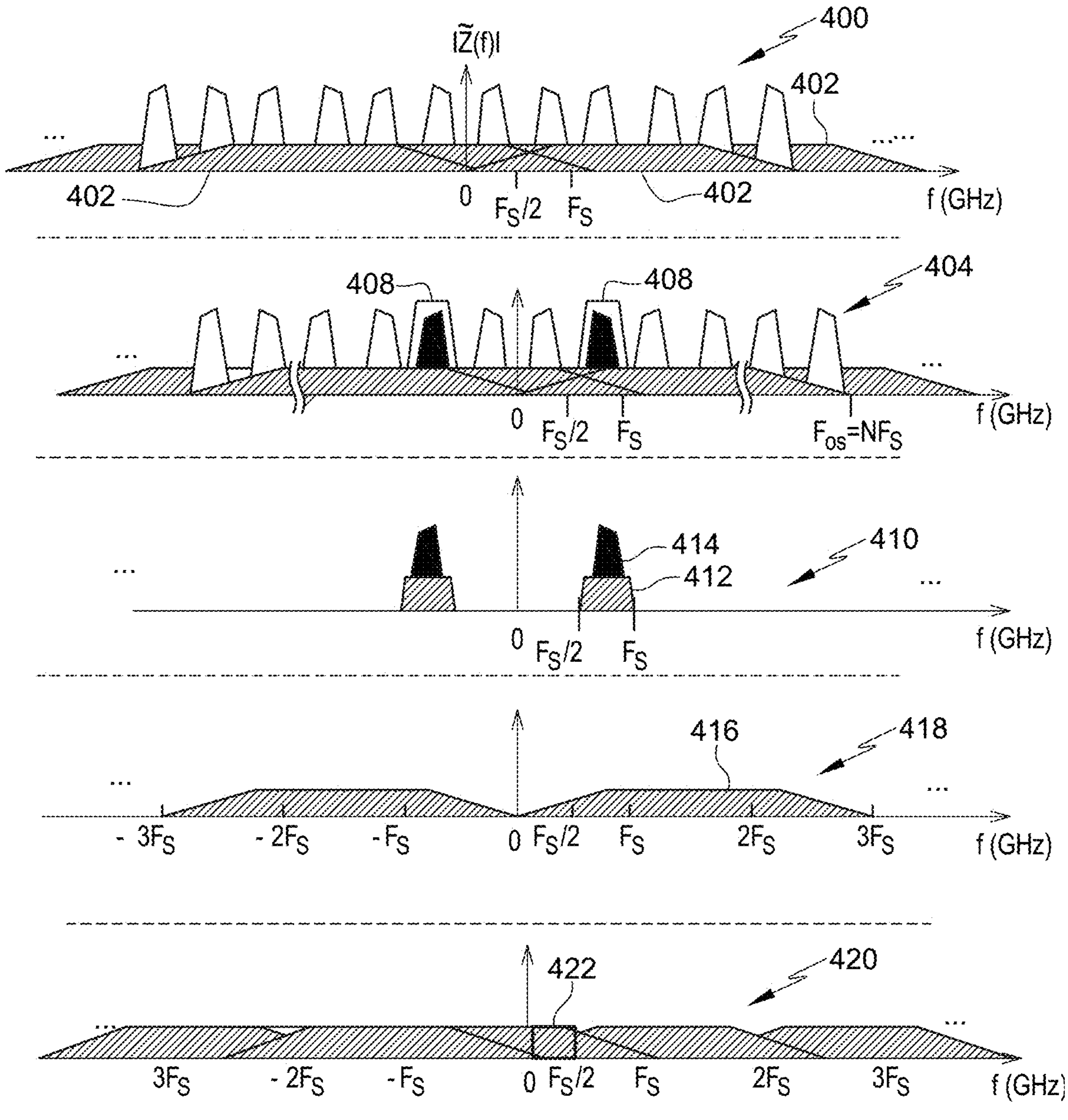
FIG. 4 illustrates frequency characteristics during the implementation of a method of dynamic nonlinearity reconstitution by a correction chain, involving an upsampling, according to an example of embodiment of the present disclosure.
Figure 5A:
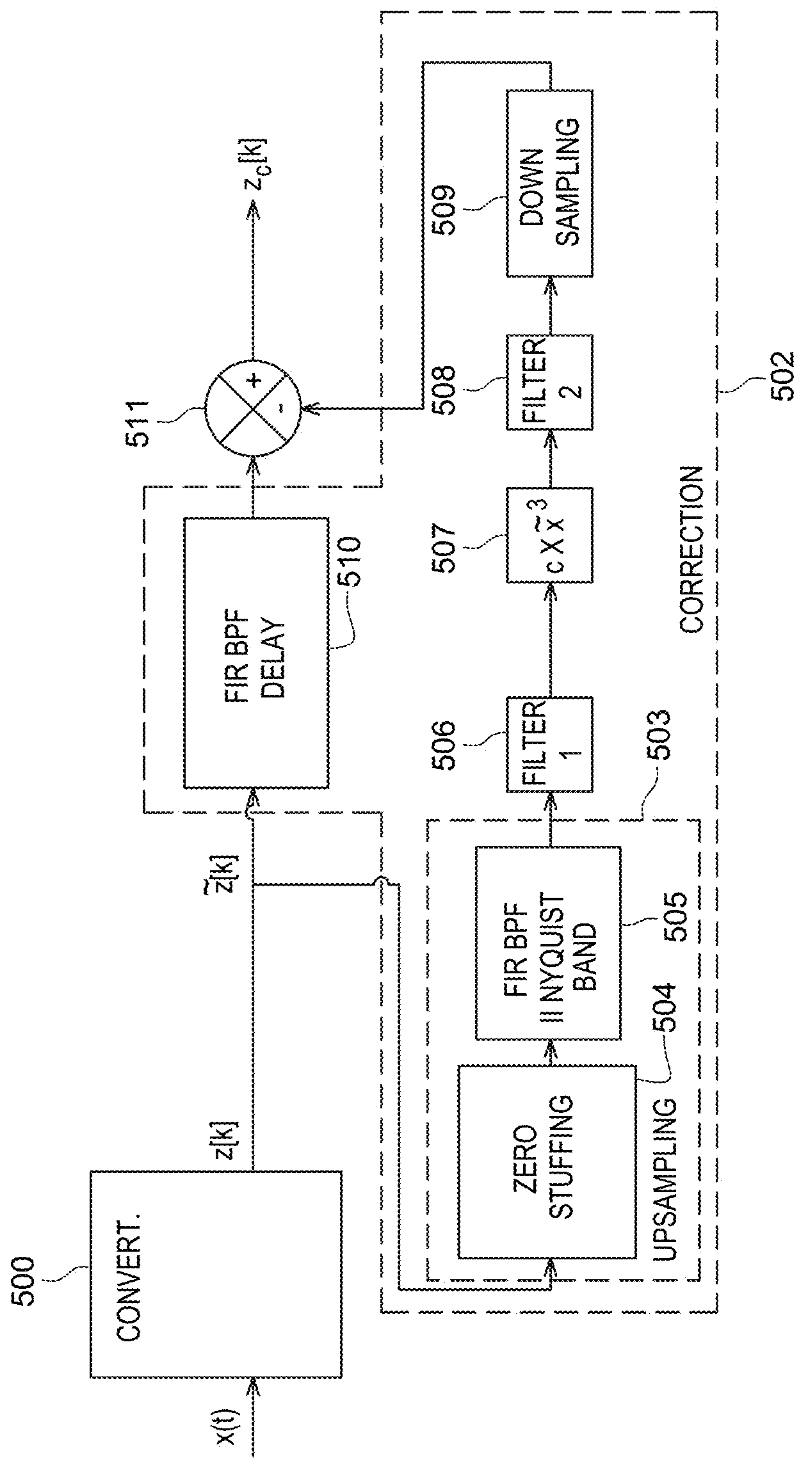
FIG. 5A illustrates, in the form of blocks, a method of dynamic nonlinearity reconstitution and of correction of a signal according to an example of embodiment of the present disclosure.

FIG. 4 illustrates frequency characteristics during the implementation of a method of reconstitution of dynamic nonlinearities by a correction chain and in particular by the method described in relation with FIG. 5A.

FIG. 5A illustrates, in the form of blocks, a method of reconstitution of dynamic nonlinearities and of correction of a signal according to an embodiment of the present disclosure.

At a step 500 (CONVERT.), analog signal x(t) is, for example, received by reception element 104, is processed by front-end circuit 108, then is sampled and digitized by analog-to-digital converter 110, resulting in a signal $\tilde{z}[k]$.

The graph 400 of FIG. 4 illustrates the spectrum $|\tilde{Z}(f)|$ of signal $\tilde{z}[k]$. The spectrum then comprises the nonlinearities 402 corresponding to the replications of the nonlinearities 308 having occurred during the sampling during step 500.

The method continues in a phase 502 (CORRECTION), for example executed by correction chain 114. In another example, phase 502 is carried out via processor 120 by executing codes 126.

Phase 502 comprises an upsampling phase 503 (UPSAMPLING) comprising steps 504 (ZERO STUFFING) and 505 (FIR BPF II NYQUIST BAND). During the carrying out of upsampling step 503, the signal is, for example, upsampled according to a frequency $F_{os}$ equal to $N \times F_s$. As an example, step 504 comprises an operation of insertion of N-1 zeroes between each sample and step 505 comprises the application of a finite impulse response bandpass filter isolating the second Nyquist band (II). In another example, step 503 comprises a plurality, for example three, successive steps of insertion of a zero between each sample, as well as a filtering step. For example, $N=2^n$, n being an integer for example equal to 3, and step 503 comprises n successive steps of upsampling by a factor 2. As an example, each step of upsampling by a factor 2 comprises a step of insertion of 1 zero between each sample, as well as a filtering step. As an example, the filtering comprises the application of a finite impulse response low-pass or high-pass filter.

Phase 502 further comprises a sequence of steps 506 to 509, subsequent to step 503, as well as a step 510, for example carried out in parallel with steps 503, 506 to 509.

In particular, steps 503, 506 to 509 aim at forming an approached reconstitution of the harmonics and intermodulation products of rank 3 present in the first Nyquist band of the spectrum $|\tilde{Z}(f)|$ and generated during the passing of the signal through reception chain 106.

Step 503 comprises the insertion of N-1 samples of value 0 during step 504. After step 504, a bandpass filter isolating the second Nyquist band (II) is applied at a step 505 (FIR BPF II NYQUIST BAND).

A graph 404 illustrates the effect of the application of step 504 to the spectrum of the signal being processed. The information contained in the second Nyquist band is illustrated by portions of spectrum 408. The sampling frequency of the signal then is frequency $F_{os}$, equal to $N \times F_s$.

After steps 504 and 505, the Nyquist band is isolated. An example of the spectrum of the signal being processed is illustrated by graph 410. The second Nyquist band then comprises dynamic nonlinearities 412 to be reconstituted and corrected and a portion 414 corresponding to the signal carrying the information. The sampling frequency then is frequency $F_{os}$.

The method then continues at step 506 (FILTER1) where a filter, for example an infinite impulse response (IIR) filter is applied. According to an embodiment, the filter is synthesized upstream and aims at reversing the phase rotation induced by the conversion of signal x(t) by reception circuit 106. More precisely, the filter used at step 506 inverts the amplitude and the phase of the signal carrying the information. As an example, the inversion of the amplitude corresponds to a multiplication by the inverse of the gain of front-end circuit 108. The gain of front-end circuit 108 is, for example, assumed to be a constant value, equal to the average of the gain of circuit 108 over a frequency range, for example over the second Nyquist band.

The harmonics and intermodulation products of rank 3 are then generated during step 507 ($c\times\tilde{x}^3$), $\tilde{x}$ being the signal obtained at the output of step 506. Step 507 comprises multiplying the cube of signal $\tilde{x}$ by a coefficient c determined upstream. Portion 414 of the spectrum is, for example, used as a basis to reconstruct the dynamic nonlinearities. Indeed, portion 412 of the spectrum is assumed to be negligible with respect to portion 414 since it has a low amplitude. The value of coefficient c being small, for example, the result of the multiplication of portion 412 by c, performed during step 507, remains negligible.

In another example, a gain correction step (not illustrated in FIG. 5A) is carried out between step 506 and step 507. The signal at the output of step 506 is then multiplied by the inverse of the average of the gain over the second Nyquist band.

Coefficient c is obtained, for example, by simulation of reception circuit 106. As an example, coefficient c is obtained as a result of the calculation of the amplitude of the harmonics and intermodulation products of rank 3 generated due to an analog model of reception circuit 106 and/or due to laboratory measurements on reception circuit 106. The model of the circuit is, for example, a SPICE model, etc.

The harmonics and the intermodulation products of rank 3 generated at step 507, and then filtered at step 508, then are a reconstitution of dynamic nonlinearities 412. The reconstitution of dynamic nonlinearities 412 then is an estimate of these nonlinearities. An example of the spectrum 416 associated with the harmonics and intermodulation products of rank 3 generated at step 507 is illustrated by a graph 418. Although nonlinearities 412 comprise nonlinearities other than the harmonics and intermodulation products of rank 3, these are considered as negligible. Indeed, harmonics and intermodulation products of even rank are removed by the processing into a differential signal by coupling circuit 200. Harmonics and intermodulation products having a rank greater than or equal to 5 are less significant than those of rank 3 and may be considered as being negligible.

After step 507, the method continues at step 508 (FILTER2) where another filter, synthesized upstream, is applied to the harmonics and intermodulation products of rank 3 generated during step 507. The application of this filter enables to modify the amplitude and the phase of the generated harmonics and intermodulation products of rank 3. According to an embodiment, this filter is configured so as to approximate the amplitude and phase modifications undergone by analog signal x(t) during its processing by reception circuit 106.

As an example, the filter used at step 508 has form $$F(z) = \frac{\sum_{k=0}^{N_b-1} b_k z^{-k}}{1 + \sum_{l=1}^{N_a-1} a_l z^{-l}},$$

where coefficients ($b_0, \ldots, b_{N_b-1}$) and ($a_1, \ldots, a_{N_b-1}$) for example originate from a simulation of front-end circuit 108. The values of terminals $N_a$ and $N_b$ result from the characteristics of the synthesized infinite impulse response filter.

The filtered harmonics and intermodulation products of rank 3 are then downsampled in an embodiment of step 509 (DOWNSAMPLING). As an example, the downsampling then is a decimation by number N, comprising, for example, the removal of N-1 samples every N samples, enabling the return of the sampling frequency to frequency $F_s$.

At step 510 (FIR BPF DELAY), a delay is applied to signal $\tilde{z}[k]$ to compensate for a delay generated by upsampling step 503. As an example, the delay is implemented in hardware fashion by the use of a shift register.

As an example, step 510 is executed, for example by processor 120, in parallel with steps 503, 506 to 509. In another example, step 510 is executed before step 503 and the result is stored, for example in a register of the circuit, or in volatile memory 122 while waiting for the end of phase 502. Still in another example, step 510 is carried out after 509. The value of signal $\tilde{z}[k]$, then is for example copied into a register or in volatile memory 122 while waiting for the end of the execution of step 509.

As an example, a step identical to step 510 is also carried out on the signal at the output of step 508, and before the upsampling of step 509. As an example, the carrying out of this step depends on the number of coefficients used in one or a plurality of finite impulse response filters during upsampling step 505.

A graph 420 illustrates the spectrum of the signal obtained after step 509. In particular, a portion of spectrum 422, located in the first Nyquist band, corresponds to a corrective term of signal $\tilde{z}[k]$.

After phase 502, a step 511 allows the correction of signal $\tilde{z}[k]$. A digital signal $z_c[k]$ is then generated by removing the correction signal, obtained at step 509, from signal $\tilde{z}[k]$, delayed at step 510.

Figure 5B:
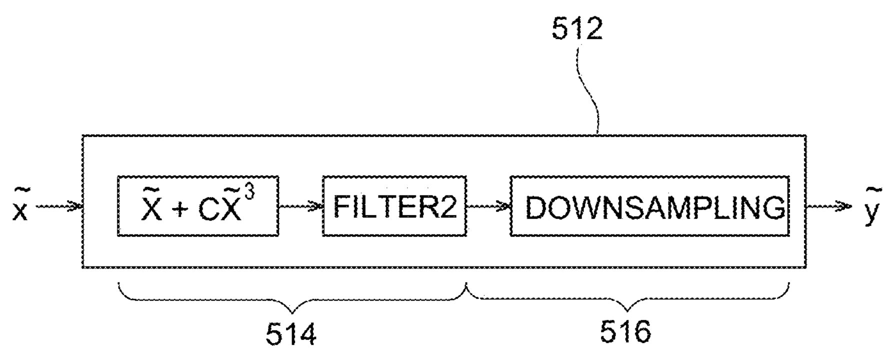
FIG. 5B is a block diagram illustrating an example of digital representation of the reception chain.

Coefficient c as well as coefficients $(a_l)_{1\le l\le N_a-1}$ $(b_k)_{0\le k\le N_b}$ are, for example, calculated based on a digital modeling of the reception chain 106 described in relation with FIG. 5B. As an example, this modeling is used in simulations of the behavior of reception chain 106, for example SPICE simulations.

FIG. 5B is a block diagram illustrating an example of digital representation of reception chain 106.

A digital modeling 512 of reception chain 106 takes, for example, as input data, a vector $\tilde{x}$. Vector $\tilde{x}$ is, for example, a digital, and thus discrete, and upsampled signal. Signal $\tilde{x}$ models, for example, a DC analog signal. As an example, the upsampling corresponds to a sampling at a frequency equal to N times sampling frequency $F_s$.

As an example, digital modeling 512 comprises a portion 514 modeling the behavior of front-end circuit 108 and a portion 516 modeling the behavior of analog-to-digital converter 110.

Portion 514 comprises, for example, an operation ($\tilde{x}+c\tilde{x}^3$) modeling the generation of the harmonics and intermodulation products of rank 3. This operation adds to vector $\tilde{x}$ product $c\times\tilde{x}$, modeling harmonics and intermodulation products of rank 3, and where coefficient c is the same coefficient as described in relation with step 507. Vector $\tilde{x}+c\tilde{x}^3$ then corresponds to the signal to which are added the harmonics and intermodulation products of rank 3.

Portion 514 further comprises a filtering operation, applying filter FILTER2, described in relation with step 508 of FIG. 5A, to noisy signal $\tilde{x}+c\tilde{x}^3$.

Portion 516 comprises, for example, a downsampling operation (DOWNSAMPLING) allowing digital model 512 to supply an output vector $\tilde{y}$ corresponding to an analog signal sampled at sampling frequency $F_s$.

Figure 6:
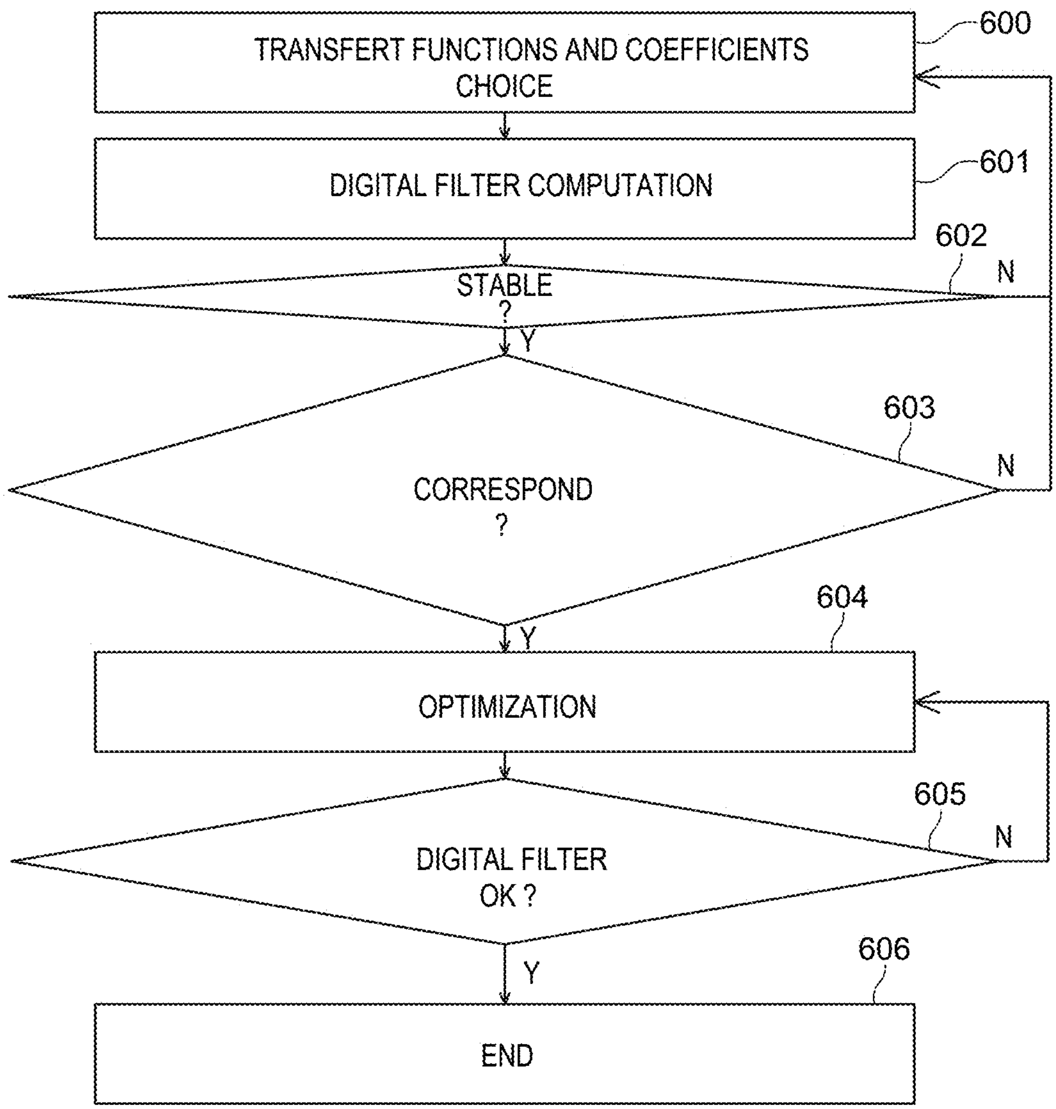
FIG. 6 is a flowchart illustrating steps, carried out upstream and based on measurements, of synthesis of a filter of the correction chain according to an embodiment of the present disclosure.

FIG. 6 is a flowchart illustrating steps of synthesis of the filters, applied during steps 506 and 508, for example, by correction chain 114 or processor 120, according to an example of embodiment of the present disclosure.

As an example, a template, comprising the frequency responses, in amplitude and in phase of an analog filter contained in front-end circuit 108, is obtained as a result of one or a plurality of simulations of front-end circuit 108. The implementation of the method described in relation with FIG. 6 allows the synthesizing of the digital filters used at steps 506 and 508. These two filters are assumed to be infinite impulse response (RII) filters, which have the advantage of being capable of simulating the behavior of analog filters comprising a nonlinear phase rotation.

The method described in relation with FIG. 6 is, for example, carried out before the manufacturing of electronic device 100 and is, for example, executed by a computer.

At a step 600 (TRANSFERT FUNCTIONS AND COEFFICIENTS CHOICE), transfer functions corresponding to analog filters are arbitrarily or randomly selected. As an example, a list comprising transfer functions associated with analog filters is stored in a non-volatile memory of the computer. Once the transfer function(s) have been selected, the coefficients of these functions are also arbitrarily, for example randomly, selected. As an example, the coefficients represent a gain and/or a cut-off impulse/frequency and/or a damping factor etc. of the transfer functions.

At a step 601 (DIGITAL FILTER COMPUTATION), a digital filter is calculated, for example by a computing unit of the computer, based on the transfer functions and coefficients selected at step 600. As an example, the calculation of the filter comprises, for example, the calculation of a transfer function by applying a bilinear transform enabling to pass from the transfer function(s) operating in the analog domain to a transfer function operating in the digital domain.

At a step 602 (STABLE?), the computing unit determines whether the digital filter is stable or not. As an example, the computing unit verifies whether the poles of the transfer function of the synthesized digital filter have a module smaller than 1. If it is determined that the filter is not stable (branch N), the method resumes at step 600 by selecting other transfer functions.

If during step 602, it is determined that the filter is stable (branch Y), the method continues at a step 603 (CORRESPOND?). During step 603, the amplitude and phase transfer functions of the synthesized digital filter are compared with the template of the filter of front-end circuit 108. As an example, the comparison is made based on an average, for example weighted, of the amplitude and phase quadratic errors. If it is determined that digital filter does not correspond to the analog filter (branch N), the method resumes at step 600 where other transfer functions are selected.

If, at step 603, it is determined that digital filter corresponds to the analog filter, the method continues at a step of improvement of coefficients 604 (OPTIMIZATION). As an example, the computing unit of the computer executes an optimization algorithm, such as for example a simulated annealing algorithm to modify the coefficients to obtain a transfer function approaching the template of the analog filter. As an example, the function to be minimized by the simulated annealing algorithm is an average, for example weighted, of the quadratic errors between the frequency responses in amplitude and phase of the synthesized digital filter and of the analog filter. As an example, the frequency responses in amplitude and phase of the analog filter result from the simulation of front-end circuit 108. Although the example of simulated annealing algorithm is given, other optimization algorithms, such as for example Newton or least squares or also gradient descent algorithms or any other algorithms or stochastic optimization may be adapted.

Once the coefficients of the transfer functions of the synthesized digital filter have been improved, the method continues at a step 605 (DIGITAL FILTER OK?). At step 605, it is verified whether the synthesized digital filter complies with previously-determined criteria, as compared with the analog filter obtained by simulation of front-end circuit 108. As an example, the criteria comprise a criterion of maximum interval between the frequency responses in amplitude and in phase of the two filters. As an example, if the frequency responses exhibit an interval greater than 3 dB in amplitude or an interval greater than 2° in phase, the criteria are determined as not being complied with. The 3-dB and/or 2° interval values are given as an illustration and are not limiting. Those skilled in this art will be capable of adapting them, as well as the parameterizing of the optimization method selected during the carrying out of step 604, according to the desired degree of accuracy. Indeed, it is of course possible to modify parameters, or exploration values, authorized for each coefficient to be optimized, such as for example the upper and/or lower limits and/or the pitch between values successively taken by a coefficient. The mentioned parameters are a non-exhaustive list of the parameters taken into account by an optimization algorithm. These parameters depend on the selected algorithm.

If, at step 605, it is determined that the criteria are not complied with (branch N), the method resumes in an implementation of optimization step 604. As an example, each new implementation of step 604 is performed by increasing the accuracy of the optimization algorithm.

If, at step 605, it is determined that the criteria are complied with (branch Y), then the method ends at step 606 (END) and the digital filter is ready. According to an embodiment, the application of the digital filter to a signal is then implemented in the form of a code among codes 126. In another example, the application of the filter is implemented in hardware fashion in correction chain 114.

Figure 7A:
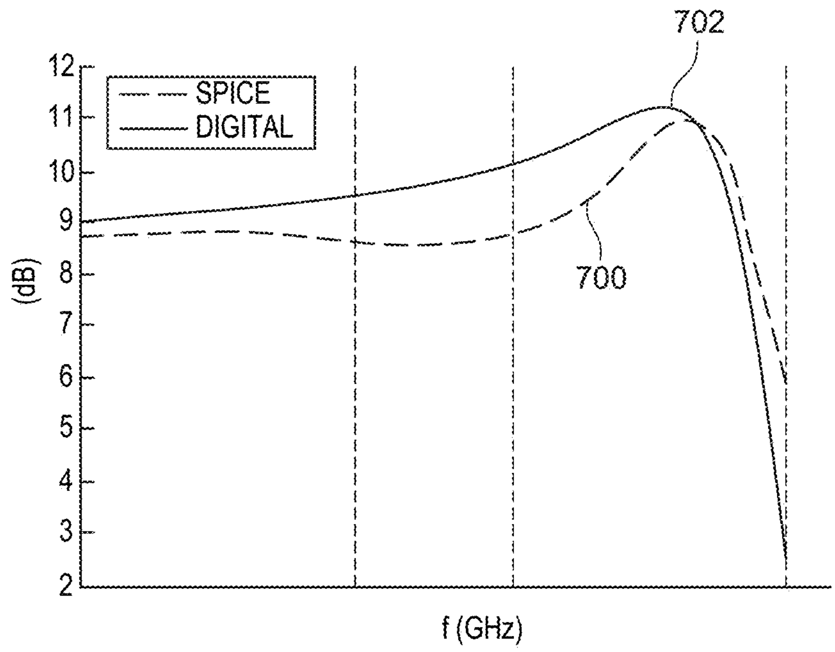
FIG. 7A is a graph illustrating the amplitudes of the transfer functions of the synthesized filter and of a simulated filter.

FIG. 7A is a graph illustrating the amplitudes of the transfer functions of the synthesized filter and of a simulated filter. In particular, FIG. 7A illustrates amplitudes 700 and 702 of transfer functions.

The amplitude of transfer function 700 (SPICE) is, for example, obtained from the frequency responses in amplitude of an analog simulation of front-end circuit 108 or by laboratory measurements. These frequency responses in amplitude and in phase are those which are desired to be approximated by means of a synthesized filter. The amplitude 702 of the transfer function (DIGITAL) is, for example, obtained as a result of the application of the method described in relation with FIG. 6. In this example, the mean quadratic error between the two amplitudes is of 1.1052 dB.

Figure 7B:
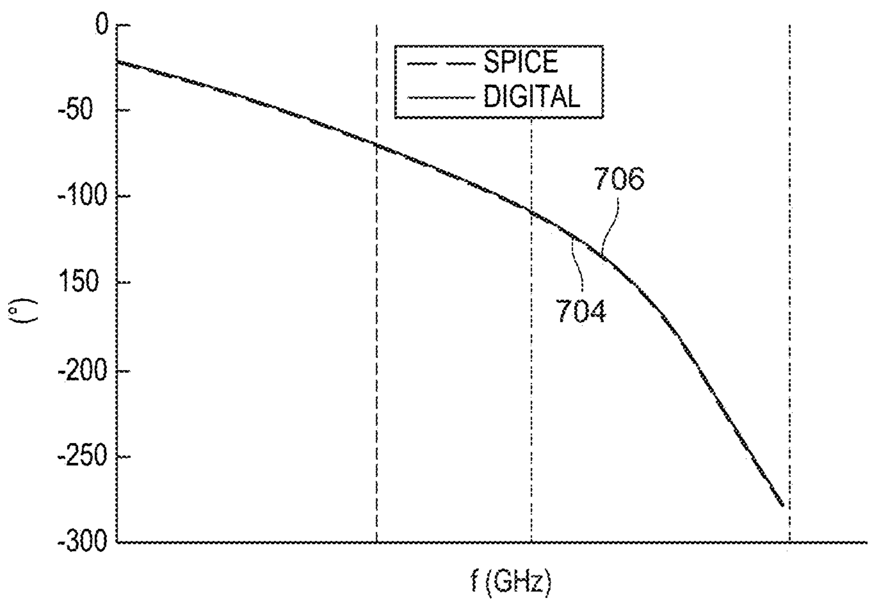
FIG. 7B is a graph illustrating the phases of the transfer functions of the synthesized filter and of the simulated filter.

FIG. 7B is a graph illustrating phases 704 and 706 of the transfer functions (SPICE, DIGITAL).

Transfer function 704 (SPICE) is, for example, obtained from the response frequencies in phase of a simulation of front-end circuit 108. For example, a SPICE simulation. The amplitude transfer function 706 is, for example, obtained as a result of the application of the method described in relation with FIG. 6. In this example, the mean quadratic error between the two transfer functions is 1.1299°.

Transfer functions 702 and 706 are, for example, the transfer functions of the synthesized digital filter used at step 508.

Figure 8A:
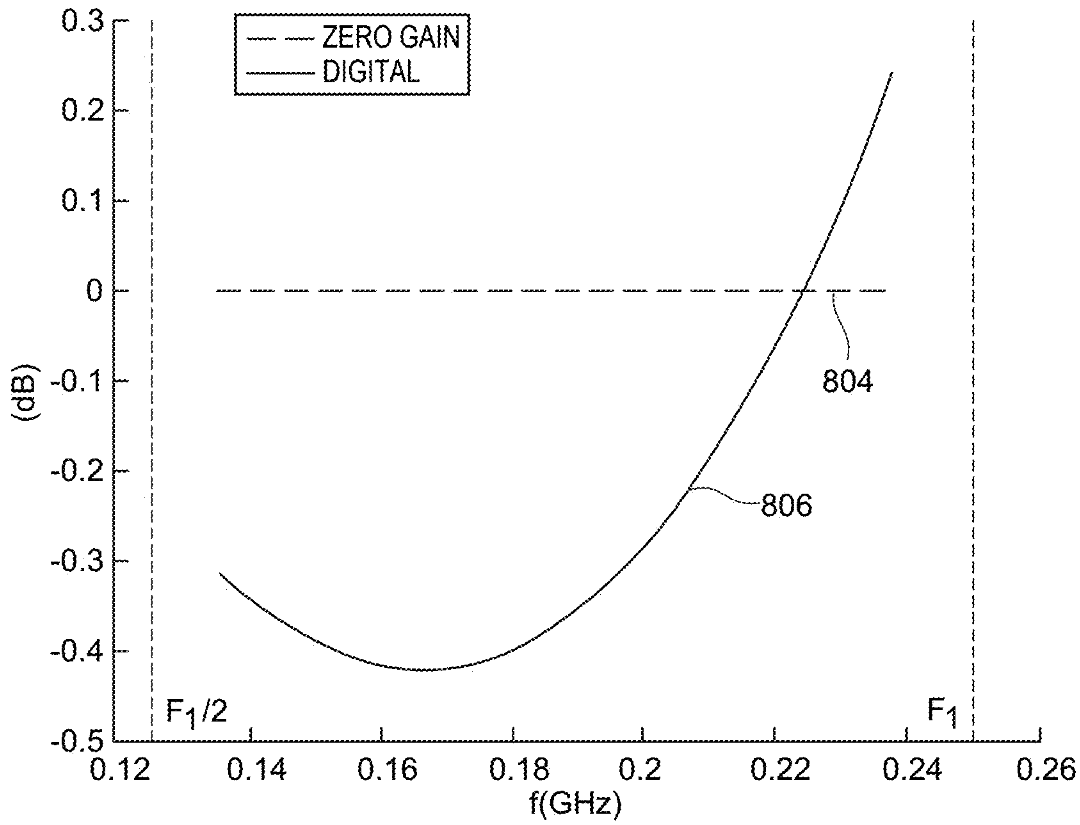
FIG. 8A is a graph illustrating the amplitudes of the transfer functions of another synthesized filter and of another filter used in the correction chain.

FIG. 8A is a graph illustrating curves 804 and 806 representing the amplitude of two transfer functions. Curve 804, illustrated in dotted lines, shows the zero gain of a synthesized digital version of a filter, called phase inverter. The phase inverter filter causes a phase rotation compensating for the phase frequency response of a simulation of front-end circuit 108 or that induced by the digital filter obtained as a result of the application of the method described in relation with FIG. 6 and based on the frequency response of front-end circuit 108. Curve 806 is, for example, obtained by application of the method described in relation with FIG. 6 to obtain a synthesized digital version of analog filter called phase inverter. As an example, as a result of the application of the synthesized digital filter, the processed signal is multiplied by the inverse of the gain of the analog filter over the second Nyquist band.

Figure 8B:
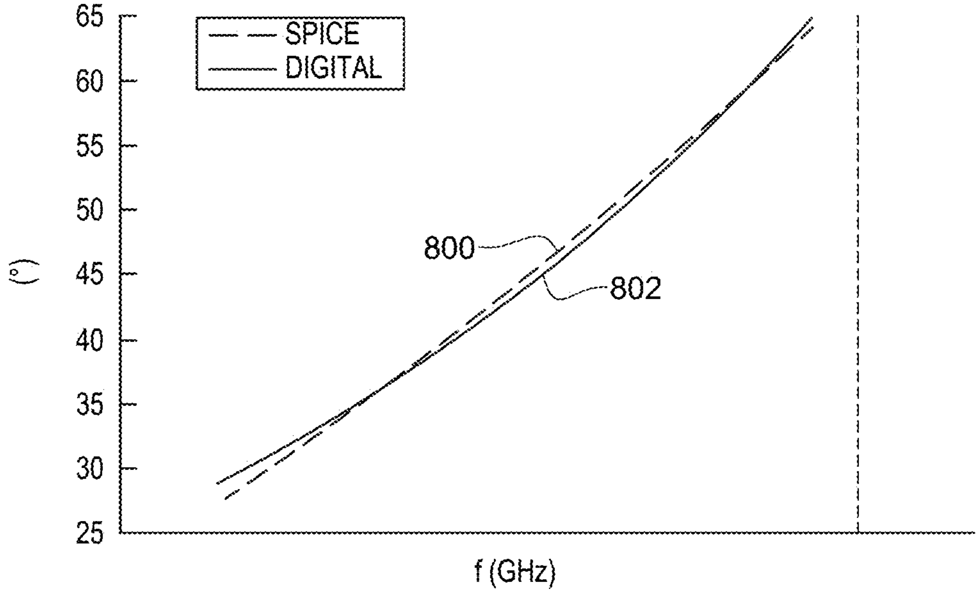
FIG. 8B is a graph illustrating the phases of the transfer functions of the other synthesized filter and of the other filter used in the correction chain.

FIG. 8B is a graph illustrating phase transfer functions 800 and 802. As an example, phase transfer function 800 is obtained from the opposite of the phase rotations induced by a digital filter obtained as a result of the application, to an analog filter obtained by simulation of front-end circuit 108 or by laboratory measurements, of the method described in relation with FIG. 6. In another example, phase transfer function 800 is obtained from the opposite of the phase rotation of an analog filter obtained by simulation of front-end circuit 108 or by laboratory measurements. Phase transfer function 802 is, for example, obtained by application of the method described in relation with FIG. 6 to obtain an infinite impulse response digital filter, called phase inverter. Transfer function 802 is then used at step 506.

Figure 9:
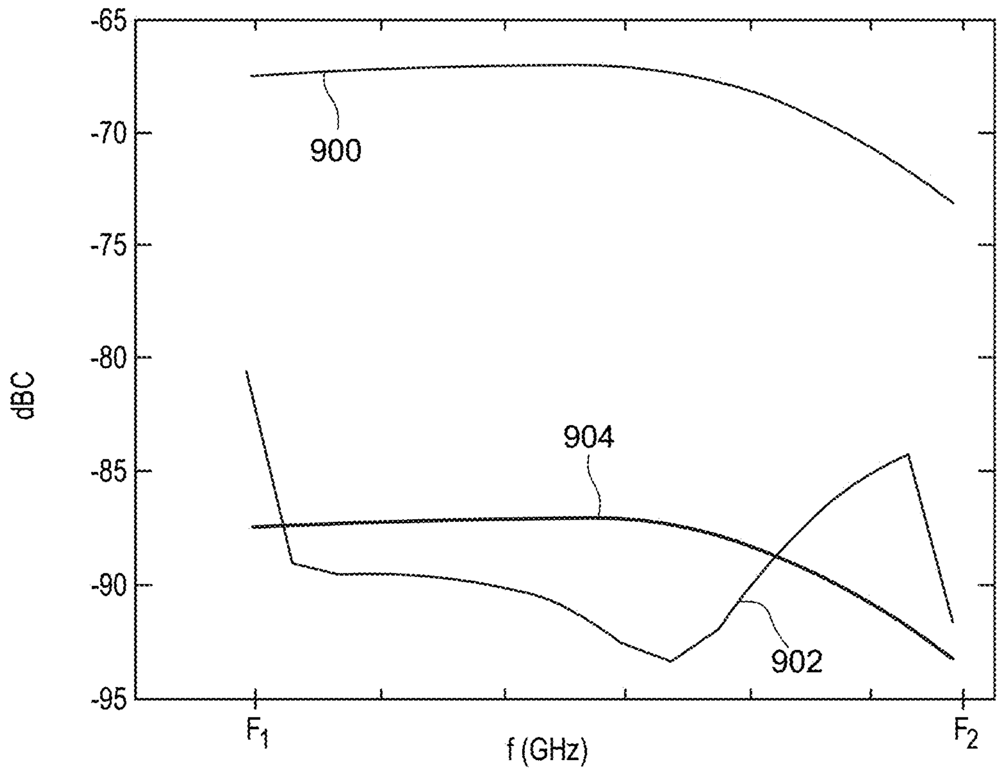
FIG. 9 is a graph illustrating the correction of a signal according to an example of embodiment of the present disclosure.

FIG. 9 is a graph illustrating the correction of a signal as a result of the application of the method described in relation with FIG. 5A. In particular, the tested signal is a sampled sine having its frequency varying between $F_1$ and $F_2$ GHZ, $F_1$ and $F_2$ being greater than 1. A curve 900 illustrates the amplitude of the harmonics of rank 3 at the output of reception circuit 106. A curve 902 illustrates the amplitude of the highest nonlinearity, including the harmonics and intermodulation products of rank 3 and of higher rank after correction du signal, according to the method described in relation with FIG. 5A. A curve 904 illustrates a 20-dB correction which would be "ideal" of these harmonics. Curve 902 is distant by at most some ten dB from "ideal" curve 904. The signal correction is thus efficient. It can further be observed that the performed correction introduces no new nonlinearities. Indeed, the accuracy of the method described in relation with FIG. 5A is a O(x^5). Nonlinearities at orders different from 3 which would be higher than the initial nonlinearities of order 3 might be introduced. However, curve 902 representing the amplitude of the highest nonlinearity, for all ranks and natures, guarantees that this is not the case.

Figure 10A:
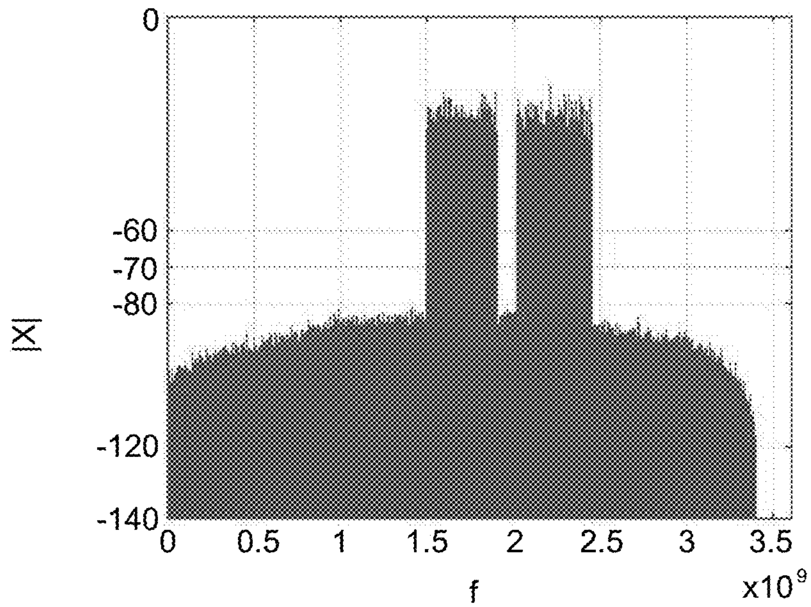
FIG. 10A is a graph illustrating the signal-to-noise ratio of a converted multitone signal before correction.

FIG. 10A is a graph illustrating the signal-to-noise ratio of a converted signal. In particular, FIG. 10A illustrates a spectrum 1000 of a converted multitone signal with harmonics and intermodulation products of rank 3 which have not been corrected. The multitone signal comprises two blocks of 900 tones, that is, a total of 1,800 tones, the two blocks being distant by 116 MHz. The phase of each of the tones is random. The signal-to-noise ratio then is represented by a difference 1002 between the high (corresponding to the two tone blocks) and low (noise) portions of the spectrum.

Figure 10B:
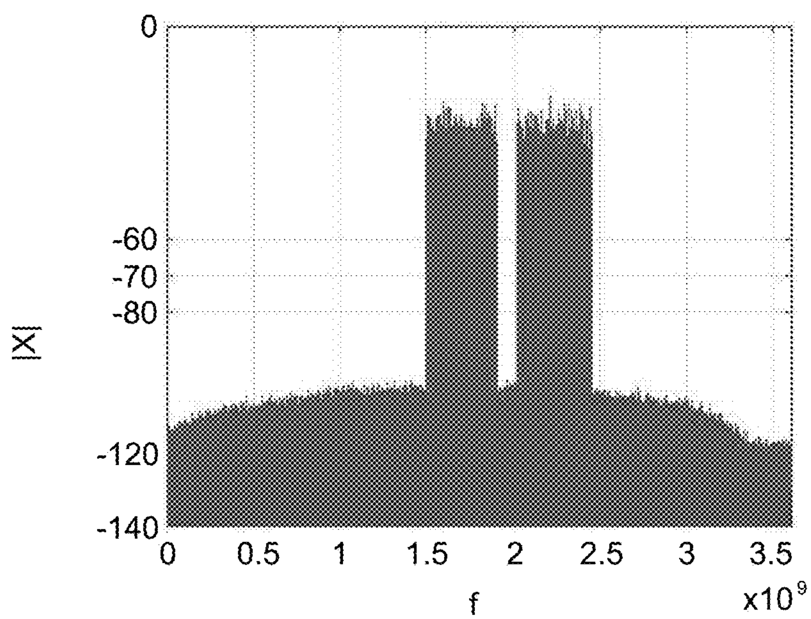
FIG. 10B illustrating the signal-to-noise ratio of a converted multitone signal after correction according to an embodiment of the present disclosure.

FIG. 10B is a graph illustrating the signal-to-noise ratio of a signal converted and corrected according to the method described in relation with FIG. 5A. In particular, FIG. 10B illustrates a spectrum 1004, for example corresponding to the same signal as illustrated in FIG. 10A, but for which harmonics and intermodulation products of rank 3 have been generated and reconstituted, according to the embodiment described in relation with FIG. 5A. A difference 1006 between the top and bottom portions of the spectrum represents the signal-to-noise ratio. It can be observed that the signal-to-noise ratio is much better once the signal has been corrected according to the embodiment described in relation with FIG. 5A.

Various embodiments and variants have been described. Those skilled in the art will understand that certain features of these various embodiments and variants may be combined, and other variants will occur to those skilled in the art. In particular, the sampling, upsampling, and downsampling methods may be adapted. For example, the upsampling methods may be implemented progressively, in a plurality of steps. For example, the upsampling is performed by a plurality of upsamplings by a factor two, consisting of the insertion of a zero between each sample and by applying a half-band low-pass or high-pass FIR filter, and this, after each zero stuffing. Similarly, the synthesis of the filters used at steps 506 and 508 may vary.

Finally, the practical implementation of the described embodiments and variants is within the abilities of those skilled in the art based on the functional indications given hereabove. In particular, regarding the synthesis of the filters used during steps 506 and 508.

The invention claimed is:

1. A circuit, comprising:

a reception chain configured to convert an analog signal into a digital signal;

a correction chain configured to generate a correction digital signal reconstituting dynamic nonlinearities generated by the reception chain, based on the digital signal and on a first filter; and circuitry configured to generate a corrected digital signal from which the dynamic nonlinearities have been removed by subtracting the correction digital signal from the digital signal;

wherein the correction chain comprises:

a first circuit configured to upsample the digital signal;

a second filter configured to filter the upsampled digital signal;

a second circuit configured to generate harmonics and intermodulation products of rank 3 by multiplying a cubing of the filtered upsampled digital signal by a coefficient;

wherein said first filter is configured to filter the harmonics and intermodulation products of rank 3; and a third circuit configured to downsample an output of the first filter.

2. The circuit according to claim 1, wherein the reception chain comprises a coupling circuit, a low-noise amplifier, and a time interleaved analog-to-digital converter.

3. The circuit according to claim 1, further comprising:

a non-volatile memory configured to store instructions allowing a programming of the correction chain; and a processor configured to execute the instructions as a result of the reception, by the reception chain, of the analog signal.

4. The circuit according to claim 1, wherein the correction chain is implemented by an application specific integrated circuit.

5. The circuit according to claim 1, wherein the second filter is an infinite impulse response filter synthesized to reverse a phase rotation induced by an analog filter of the reception chain.

6. The circuit according to claim 5, wherein the first filter is a digital infinite impulse response filter configured to model the analog filter of the reception chain.

7. The circuit according to claim 5, wherein the first filter is a filter having a transfer function corresponding to a transfer function of the reception chain to within 3 dB in amplitude and to within 2° in phase until a cut-off frequency.

8. The circuit according to claim 7, wherein the transfer function of the first filter is an amplitude transfer function F of form:

$$F(z)=\frac{\sum_{k=0}^{Nb-1} b_k z^{-k}}{1+\sum_{l=1}^{Na-1} a_l z^{-l}},$$

where Nb is the number of coefficients of the numerator of the first filter, Na is the number of coefficients of the denominator of the first filter, and where coefficients $\{b_0, \ldots, b_{Nb-1}\}$ and $\{a_1, \ldots, a_{Na-1}\}$ are optimized as a result of an execution of an optimization algorithm.

9. The circuit according to claim 1, wherein the correction chain further comprises a fourth circuit configured to apply a gain correction operation.

10. The circuit according to claim 1, wherein the upsampling comprises upsampling the digital signal by a number N, N being an integer greater than or equal to 2.

11. The circuit according to claim 10, wherein the downsampling comprises downsampling with a decimation by number N.

12. The circuit according to claim 1, wherein the first circuit performs the upsampling by:
- inserting a zero between each digital sample; and
- applying one of a finite impulse response low-pass filtering or a finite impulse response high-pass filtering.

13. The circuit according to claim 1, further comprising, before said circuitry configured to generate the corrected digital signal, further circuitry configured to apply a finite impulse response bandpass filtering and apply a delay compensation operation to the digital signal.

14. A method, comprising:
- converting, via a reception chain, an analog signal into a digital signal;
- generating, by a correction chain, a correction signal estimating dynamic nonlinearities generated by the reception chain, based on the digital signal and based on a first digital filter; and
- removing the dynamic nonlinearities by subtracting the correction signal from the digital signal to generate a corrected digital signal;
- wherein generating the correction signal comprises:
  - upsampling the digital signal;
  - applying a second filter to the upsampled digital signal;
  - generating harmonics and intermodulation products of rank 3 by multiplying a cubing of the filtered upsampled digital signal by a coefficient;
  - applying the first digital filter to the harmonics and intermodulation products of rank 3; and
- downsampling the filtered harmonics and intermodulation products of rank 3.

15. The circuit according to claim 1, further comprising, before said circuitry configured to generate the corrected digital signal, further circuitry configured to apply a finite impulse response bandpass filtering and apply a delay compensation operation to the digital signal.

16. The method according to claim 14, wherein the second filter is an infinite impulse response filter synthesized to reverse a phase rotation induced by an analog filter of the reception chain.

17. The method according to claim 16, wherein the first digital filter is a digital infinite impulse response filter configured to model the analog filter of the reception chain.

18. The method according to claim 16, wherein the first digital filter is a filter having a transfer function corresponding to a transfer function of the reception chain to within 3 dB in amplitude and to within 2° in phase until a cut-off frequency.

19. The method according to claim 18, wherein the transfer function of the first digital filter is an amplitude transfer function F of form:

$$F(z)=\frac{\sum_{k=0}^{Nb-1} b_k z^{-k}}{1+\sum_{l=1}^{Na-1} a_l z^{-l}},$$

where Nb is the number of coefficients of the numerator of the first filter, Na is the number of coefficients of the denominator of the first filter, and where coefficients $\{b_0, \ldots, b_{Nb-1}\}$ and $\{a_1, \ldots, a_{Na-1}\}$ are optimized as a result of an execution of an optimization algorithm.

20. The method according to claim 14, wherein generating the correction signal by the correction chain further comprises applying a gain correction operation.

21. The method according to claim 14, wherein upsampling comprises upsampling the digital signal by a number N, N being an integer greater than or equal to 2.

22. The method according to claim 21, wherein downsampling comprises decimation by number N.

23. The method according to claim 21, wherein upsampling comprises:
- inserting a zero between each digital sample; and
- applying one of a finite impulse response low-pass filtering or a finite impulse response high-pass filtering.

24. The method according to claim 14, further comprising applying a finite impulse response bandpass filtering and applying a delay compensation operation to the digital signal, before generating the corrected digital signal.

25. A circuit, comprising:
- a reception chain including an analog filter, said reception chain configured to convert an analog signal into a digital signal;
- a correction chain configured to generate a correction digital signal reconstituting dynamic nonlinearities generated by the reception chain, based on the digital signal and on a first filter;
- wherein the first filter is a digital infinite impulse response filter configured to model the analog filter of the reception chain;
- wherein a transfer function of the first filter is an amplitude transfer function F of form:

$$F(z)=\frac{\Sigma_{k=0}^{Nb-1} b_k z^{-k}}{1+\Sigma_{l=1}^{Na-1} a_l z^{-l}},$$

where Nb is the number of coefficients of the numerator of the first filter, Na is the number of coefficients of the denominator of the first filter, and where coefficients $\{b_0, \ldots, b_{Nb-1}\}$ and $\{a_1, \ldots, a_{Na-1}\}$ are optimized as a result of an execution of an optimization algorithm; and circuitry configured to generate a corrected digital signal from which the dynamic nonlinearities have been removed by subtracting the correction digital signal from the digital signal.

26. The circuit according to claim 25, wherein the reception chain comprises a coupling circuit, a low-noise amplifier, and a time interleaved analog-to-digital converter.

27. The circuit according to claim 25, further comprising:

a non-volatile memory configured to store instructions allowing a programming of the correction chain; and a processor configured to execute the instructions as a result of the reception, by the reception chain, of the analog signal.

28. The circuit according to claim 25, wherein the correction chain is implemented by an application specific integrated circuit.

29. A method, comprising:

converting, via a reception chain including an analog filter, an analog signal into a digital signal;

generating, by a correction chain, a correction signal estimating dynamic nonlinearities generated by the reception chain, based on the digital signal and based on a first digital filter;

wherein the first filter is a digital infinite impulse response filter configured to model the analog filter of the reception chain;

wherein a transfer function of the first filter is an amplitude transfer function F of form:

$$F(z) = \frac{\sum_{k=0}^{Nb-1} b_k z^{-k}}{1 + \sum_{l=1}^{Na-1} a_l z^{-l}},$$

where Nb is the number of coefficients of the numerator of the first filter, Na is the number of coefficients of the denominator of the first filter, and where coefficients $\{b_0, \ldots, b_{Nb-1}\}$ and $\{a_1, \ldots, a_{Na-1}\}$ are optimized as a result of an execution of an optimization algorithm; and removing the dynamic nonlinearities by subtracting the correction signal from the digital signal to generate a corrected digital signal.

30. The method according to claim 29, further comprising applying a finite impulse response bandpass filtering and applying a delay compensation operation to the digital signal, before generating the corrected digital signal.

* * * * *